US012135967B2

(12) United States Patent
Tzur et al.

(10) Patent No.: US 12,135,967 B2
(45) Date of Patent: Nov. 5, 2024

(54) SOFTWARE CODE REFACTORING PRIORITIZATION USING SOFTWARE CODE DEFECT AGGREGATION IN GRAPHICAL CODE REPRESENTATION

(71) Applicant: Dell Products L.P., Round Rock, TX (US)

(72) Inventors: Anat Parush Tzur, Beer Sheva (IL); Amihai Savir, Newton, MA (US); Or Herman Saffar, Ofakim (IL)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 17/742,922

(22) Filed: May 12, 2022

(65) Prior Publication Data

US 2023/0367588 A1 Nov. 16, 2023

(51) Int. Cl.
*G06F 8/72* (2018.01)
*G06F 8/65* (2018.01)

(52) U.S. Cl.
CPC . *G06F 8/72* (2013.01); *G06F 8/65* (2013.01)

(58) Field of Classification Search
CPC .......................................................... G06F 8/72
See application file for complete search history.

(56) References Cited

U.S. PATENT DOCUMENTS

| | | | |
|---|---|---|---|
| 10,970,291 B2 * | 4/2021 | McNeela | G06F 16/24578 |
| 2018/0088937 A1 * | 3/2018 | Tamir | G06F 8/433 |
| 2019/0252074 A1 * | 8/2019 | Datla | G06F 17/10 |

OTHER PUBLICATIONS

Bigelow, Stephen J., "10 Tips on when to refactor code", Published Apr. 2, 2020; https://www.techtarget.com/searchsoftwarequality/tip/When-and-how-to-refactor-code; downloaded on May 9, 2022.

CloudZero; "5 Refactoring Techniques You Can Use to Improve Your Software", Dec. 8, 2021; https://www.cloudzero.com/blog/refactoring-techniques; downloaded on May 9, 2022.

Lawrence, Cate; "When Should I Refactor Code and How to Get Buy-in for Refactoring?", Jul. 30, 2021; https://www.stepsize.com/blog/when-to-refactor-code-and-how-to-get-buy-in; downloaded on May 9, 2022.

\* cited by examiner

*Primary Examiner* — Jae U Jeon
(74) *Attorney, Agent, or Firm* — Ryan, Mason & Lewis, LLP

(57) ABSTRACT

Techniques are provided for software code refactoring prioritization using software code defect aggregation in a graphical code representation. One method comprises obtaining an indication of an error in software code; obtaining a graphical representation of the software code, wherein each node in the graphical representation corresponds to a function and wherein nodes are connected based on a hierarchical relationship; assigning a weight to a first node that corresponds to a function associated with the error; assigning a decayed weight to an additional node, selected based on the hierarchical relationship with the first node, wherein the decayed weight is determined by applying a decay function to the weight assigned to the first node; prioritizing nodes in the graphical representation for a code refactoring of the software code based on the weights assigned to each node; and initiating an automated action based on a result of the prioritizing.

20 Claims, 7 Drawing Sheets

300

FOR EACH IDENTIFIED SOFTWARE ISSUE AND CORRESPONDING SEVERITY VALUE:

IDENTIFY A CORRESPONDING NODE IN THE GRAPHICAL VIEW AND INCREASE THE CURRENT WEIGHT ASSIGNED TO THE CORRESPONDING NODE BY THE SEVERITY VALUE OF THE IDENTIFIED ISSUE;

TRAVERSE UP AT LEAST ONE LEVEL IN THE GRAPHICAL VIEW TO ONE OR MORE ANCESTOR NODES (E.G., PARENT NODES) OF THE CORRESPONDING NODE; AND

FOR EACH ANCESTOR NODE, INCREASE THE CURRENT WEIGHT ASSIGNED TO EACH ANCESTOR NODE USING A DECAY FUNCTION AND THE SEVERITY VALUE OF THE IDENTIFIED ISSUE (E.G., SEVERITY VALUE OF THE IDENTIFIED ISSUE MULTIPLIED BY A DECAY ROOT CAUSE COEFFICIENT, RAISED TO THE POWER OF THE HIERARCHICAL LEVEL NUMBER OF THE ANCESTOR NODE).

FIG. 3

SOFTWARE CODE REFACTORING PRIORITIZATION USING SOFTWARE CODE DEFECT AGGREGATION IN GRAPHICAL CODE REPRESENTATION

FIELD

The field relates generally to information processing systems and more particularly, to the processing of software code changes using such information processing systems.

BACKGROUND

A number of techniques exist for making changes to software code. Code refactoring, for example, is a technique for restructuring existing software code (sometimes referred to as changing the factoring), to improve the design and/or structure of the software code without changing the functionality of the software code. Code refactoring is typically considered an expensive operation and needs to be performed efficiently.

A need therefore exists for techniques for prioritizing software code refactoring candidates.

SUMMARY

In one embodiment, a method comprises obtaining an indication of at least one error in software code; obtaining a graphical representation of the software code, wherein the graphical representation comprises a plurality of nodes, wherein each node in the graphical representation corresponds to at least one function of the software code and wherein two or more nodes in the graphical representation are connected based at least in part on a hierarchical relationship between the nodes; assigning a weight to at least one node in the graphical representation of the software code that corresponds to at least one function of the software code associated with the at least one error; assigning a decayed weight to at least one additional node in the graphical representation of the software code, wherein the at least one additional node is selected based at least in part on the hierarchical relationship with the at least one node, and wherein the decayed weight is determined by applying a decay function to the weight assigned to the at least one node; prioritizing at least some of the nodes in the graphical representation of the software code for a code refactoring of one or more corresponding functions of the software code based at least in part on the weights assigned to each node; and initiating at least one automated action based at least in part on a result of the prioritizing.

In one or more embodiments, the indication of the at least one error further comprises an indication of a severity level of the indicated at least one error and wherein the weight assigned to the at least one node in the graphical representation is based at least in part on the severity level of the indicated at least one error.

In some embodiments, the graphical representation of the software code may be generated by executing the software code and obtaining an ordered listing of the functions executed by the software code. The assigning the weight to the at least one node in the graphical representation of the software code may comprise identifying the at least one node that corresponds to the at least one function of the software code that is a cause of the at least one error. The assigning the decayed to the at least one additional node may comprise recursively propagating the decayed weight to one or more ancestor nodes of the at least one node. The recursively propagating the decayed weight from to the one or more ancestor nodes of the at least one node may apply the decay function to the decayed weight such that the weight decreases for each traversal from the at least one node to each of the one or more ancestor nodes.

Other illustrative embodiments include, without limitation, apparatus, systems, methods and computer program products comprising processor-readable storage media.

BRIEF DESCRIPTION OF THE DRAWINGS

FIG. 3 illustrates exemplary pseudo code for a software issue weight propagation process in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for software code refactoring prioritization using software code defect aggregation in a graphical code representation.

A software solution is often developed iteratively, where a new software version is coded on top of an older software version. Over time, the iterative coding may result in a variety of coding techniques, languages, designs and/or performance characteristics in a given software product. Over time, an older portion of software code may create defects in the software (e.g., directly or indirectly) that become performance bottlenecks. Code refactoring techniques have been developed to address portions of the software code that are candidates for refactoring.

In order to determine the root cause of a given software issue, the dependency and/or correlation between two or more software defects may need to be investigated. In addition, a mechanism is needed to aggregate multiple defects with the same or a similar root cause in order to proactively identify a need for code refactoring, and/or to prioritize the code refactoring candidates. Among other benefits, the disclosed graphical-based software code refactoring prioritization techniques: (i) discover dependencies and/or correlations between multiple raised issues, (ii) aggregate multiple issues that may share the same or a similar root cause to proactively identify a need for code refactoring, and (iii) provide a comparable severity level and a detailed issue description for each issue. In this manner, code refactoring candidates can be prioritized and a better understanding can be ascertained regarding a root cause of the issues.

Figure 1:
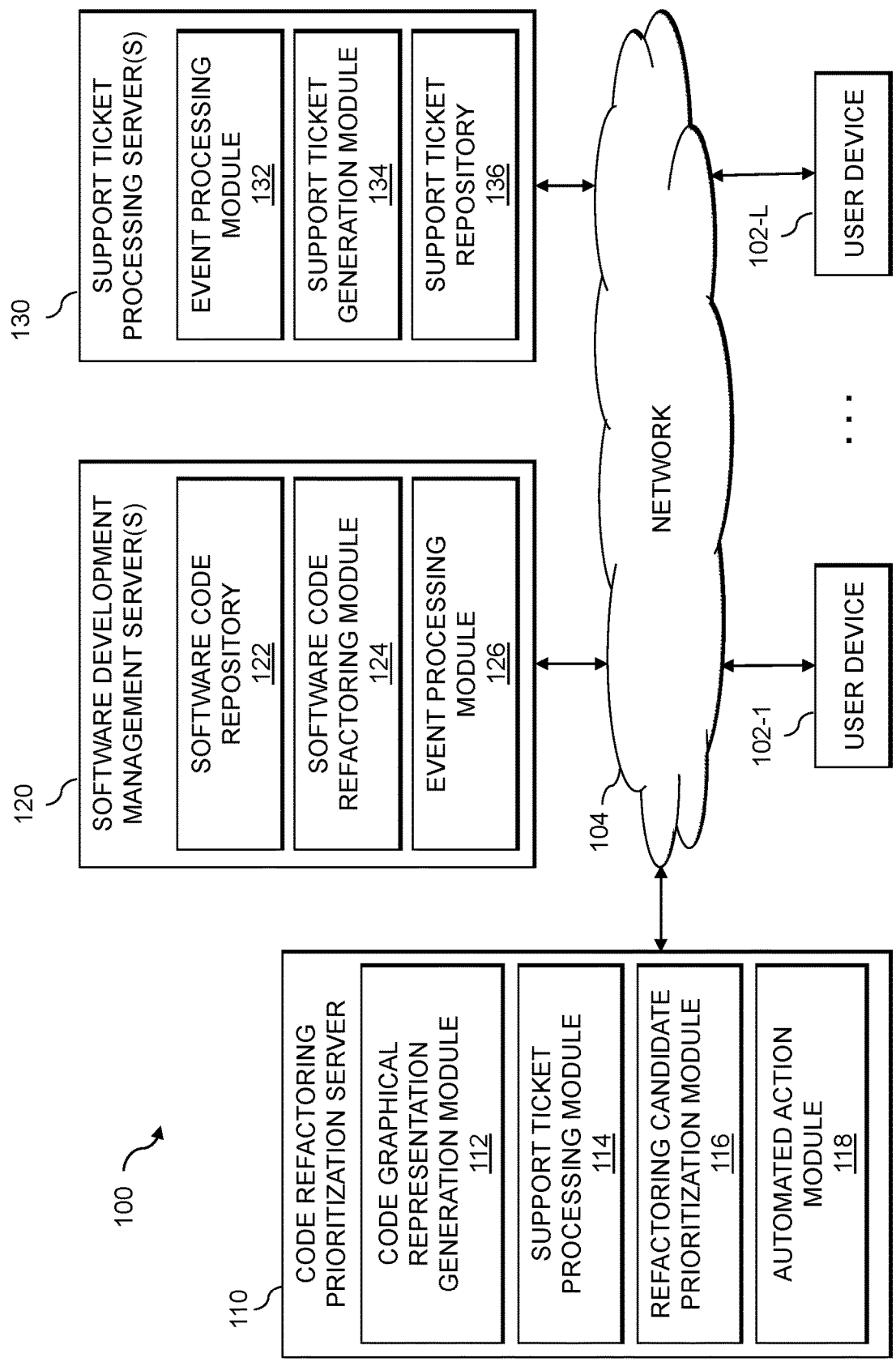
FIG. 1 illustrates an information processing system configured for software code refactoring prioritization using software code defect aggregation in a graphical code representation in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-L, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are one or more code refactoring prioritization servers 110, one or more software development management servers 120 and one or more support ticket processing servers 130.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Also associated with the user devices 102 are one or more input-output devices, which illustratively comprise keyboards, displays or other types of input-output devices in any combination. Such input-output devices can be used, for example, to support one or more user interfaces to the user devices 102, as well as to support communication between the software development management servers 120, the support ticket processing servers 130, and/or other related systems and devices not explicitly shown.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the code refactoring prioritization servers 110, the software development management servers 120 and/or the support ticket processing server 130 can have at least one associated database (not explicitly shown in FIG. 1) configured to store data pertaining to, for example, software code under development, events related to software code changes (e.g., refactoring changes), reviewer information and/or software code refactoring prioritization results such as software code refactoring changes being implemented and/or monitored by the software development management server 120.

The databases associated with the software development management servers 120 and/or the support ticket processing servers 130 can be implemented using one or more corresponding storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Additionally, the code refactoring prioritization servers 110, the software development management servers 120 and the support ticket processing servers 130 in the FIG. 1 embodiment are assumed to be implemented using at least one processing device. Each such processing device generally comprises at least one processor and an associated memory, and implements one or more functional modules for controlling certain features of the code refactoring prioritization servers 110, the software development management servers 120 and/or the support ticket processing servers 130.

More particularly, the code refactoring prioritization servers 110, the software development management servers 120 and the support ticket processing servers 130 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow for communication between the code refactoring prioritization servers 110, the software development management servers 120, the support ticket processing servers 130, and/or the user devices 102 over the network 104, and each illustratively comprises one or more conventional transceivers.

In the example of FIG. 1, the code refactoring prioritization server 110 may comprise a code graphical representation generation module 112, a support ticket processing module 114, a refactoring candidate prioritization module 116 and an automated action module 118. Generally, the code graphical representation generation module 112 obtains a sequential listing of the functions that are called by software code to generate the graphical representation (e.g., a causality graph) of the software code, as discussed further below in conjunction with FIG. 2. In some embodiments, the generated graphical representation of the software code encodes a hierarchical relationship and/or dependencies among the nodes in the graphical representation. The support ticket processing module 114 may process support tickets sent by the support ticket processing server 130 to identify issues associated with software code (e.g., software defect alerts) that may be refactored using the disclosed graphical-based software code refactoring prioritization techniques. Each software issue identified in a given support ticket typically has an associated severity category.

The refactoring candidate prioritization module 116 may prioritize (e.g., weight) refactoring candidates by evaluating a severity of issues (e.g., as indicated in a support ticket) to determine a root cause of one or more software issues and to determine an ordering for a refactoring of the software code. In addition, the refactoring candidate prioritization module 116 may traverse the graphical representation of the software code to propagate errors from a node in the graphical representation associated with a source of a particular error (e.g., in a leaf node) up the graphical representation to one or more ancestor nodes (e.g., parent nodes). In this manner, a given node in the graphical representation may be revealed as a root cause of several errors after the errors have been propagated up the graphical representation. For example, if a given ancestor node is assigned two weights from two different children nodes as part of the error propagation, the given ancestor node would be weighted higher and become a stronger candidate for refactoring.

In one or more embodiments, the automated action module 118 performs at least one automated action based at least in part on the prioritization determined by the refactoring candidate prioritization module 116. For example, the at least one automated action may comprise (i) generating at least one notification corresponding to at least one of the prioritized nodes in the graphical representation of the software code; (ii) generating update information related to an update of the software code to address the at least one error; (iii) generating a description of a plurality of errors in the software code by aggregating descriptions of the plurality of errors as each error is applied to the graphical representation of the software code; (iv) traversing the graphical representation of the software code using a graphical user interface to provide an indication of at least one of the prioritized nodes in the graphical representation; and/or (v) generating an update of the software code to address the at least one error.

In the example of FIG. 1, the representative software development management server 120 may be implemented, for example, at least in part, using the GitHub software development platform or a continuous integration and continuous delivery (CI/CD) software development platform, as modified herein to provide the disclosed features and functions for software code refactoring prioritization. The software development management servers 120 may comprise a software code repository 122, a software code refactoring module 124, and an event processing module 126. Generally, the software code repository 122 comprises multiple versions of software, such as a current software version and one or more versions undergoing software development. The software code refactoring module 124 may process refactoring changes to the software code, for example, using at least portions of the GitHub software development tool. In some embodiments, the event processing module 126 generates events related to the software code refactoring changes and publishes the messages in a messaging layer of a sequential message queue, such as Kafka messaging layer or a messaging layer of another enterprise service bus. The messages may also be stored in a database, such as a NoSQL database (e.g., a MongoDB).

In addition, the representative support ticket processing server 130 may be implemented, for example, at least in part, using the Jira™ product development tool, as modified herein to provide the disclosed features and functions for software code refactoring prioritization, that allows a project manager to track and/or monitor the issues identified with respect to software code. Each such issue typically has an associated severity level and a detailed description. The information associated with an issue allows a development team to prioritize the issues and to more efficiently fix them. Any defect alert is raised by a specific functionality component (e.g., sometimes referred to herein as a source node in the graphical representation) but one or more aspects of the disclosure recognize that revealing the root cause of such an alert is not trivial. There is still a challenge to relate different issues and to reveal the dependency and/or correlation between multiple issues to discover a root cause component.

Each of the support ticket processing servers 130 may include an event processing module 132, a support ticket generation module 134, and a support ticket repository 136. Generally, the event processing module 132 generates events corresponding to refactoring changes and/or issues related to software code. The event processing module 132 may transform the events into formats that are digestible by the code refactoring prioritization server 110, for example. In some embodiments, the support ticket generation module 134 generates a support ticket for one or more reported issues related to software code and the support ticket repository 136 maintains a repository of such generated and/or processed support tickets. A given support ticket may identify a severity level and provide a detailed description of one or more reported issues.

It is to be appreciated that the particular arrangement of elements 112-118 illustrated in the representative code refactoring prioritization server 110, the particular arrangement of elements 122-126 illustrated in the representative software development management server 120, and the particular arrangement of elements 132-136 in the representative support ticket processing server 130 of the FIG. 1 embodiment are presented by way of example only, and alternative arrangements can be used in other embodiments. For example, the functionality associated with elements 112-118, elements 122-126 and/or elements 132-136 in other embodiments can be combined into a single element, or separated across a larger number of elements. As another example, multiple distinct processors can be used to implement different ones of the elements 112-118, elements 122-126 and/or elements 132-136, or portions thereof.

At least portions of elements 112-118, elements 122-126 and/or elements 132-136 may be implemented at least in part in the form of software that is stored in memory and executed by a processor.

It is to be understood that the particular set of elements shown in FIG. 1 for software code refactoring prioritization using software code defect aggregation in a graphical code representation is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development management servers 120 and at least one associated database can be on and/or part of the same processing platform.

An exemplary process utilizing elements 112-118 of an example code refactoring prioritization server 110, elements 122-126 of an example software development management server 120 and/or elements 132-136 of an example support ticket processing server 130 in computer network 100 will be described in more detail with reference to, for example, FIGS. 2 through 5.

Figure 2:
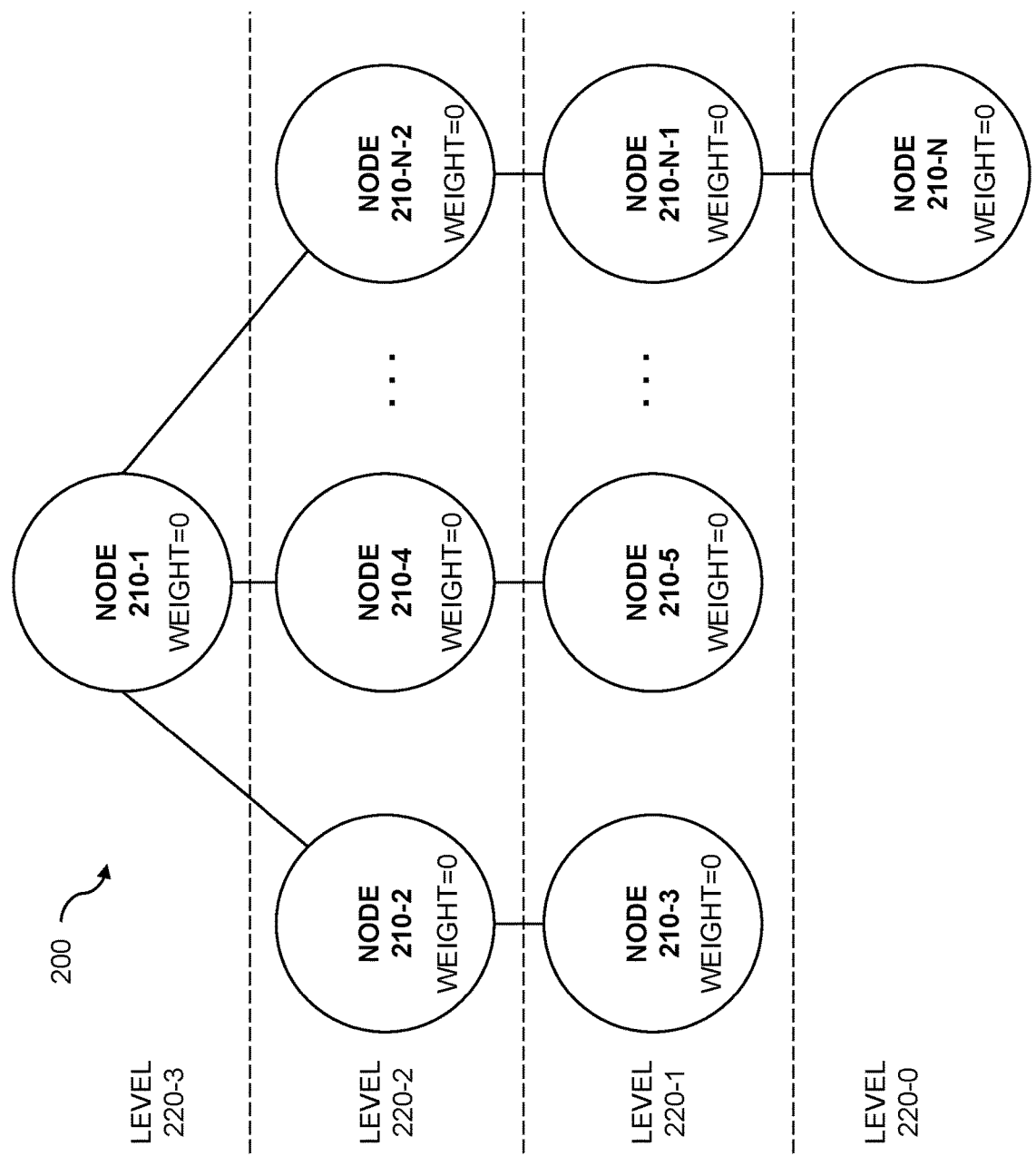
FIG. 2 illustrates a graphical view of representative software code in accordance with an illustrative embodiment.

FIG. 2 illustrates a graphical view 200 of a portion of software code in accordance with an illustrative embodiment. As noted above, the code graphical representation generation module 112 obtains, in at least some embodiments, a sequential listing of the functions (e.g., the name of each executed function and an order of usage) called by software code to generate the graphical representation (e.g., a causality graph) of the software code. The graphical representation of the software code may encode a hierarchical relationship (e.g., dependencies) among the nodes in the graphical representation, as discussed hereinafter.

In the example of FIG. 2, the graphical view 200 may be implemented as a directed acyclic graph (e.g., a graph with no cycles) and comprises a plurality of nodes 210-1 through 210-N (collectively, referred to as nodes 210), connected by edges based on a hierarchical relationship among the nodes. Each node 210 in FIG. 2 has been initialized with a weight of zero to show that the respective node does not currently have any issues that may warrant a software refactoring. A weight propagation process for propagating a weight through the graphical view 200 will be discussed further below in conjunction with FIGS. 3 and 4. In some embodiments, the weight propagation process may propagate (e.g., assign) a given weight, for example, using a decay function, through the graphical view 200 based on a hierarchical level of each node 210. Each of the nodes in the example of FIG. 2 have a corresponding hierarchical level 220-0 through 220-3 (e.g., for hierarchical level numbers 0 through 3).

Each node 210 may correspond to at least one software function and/or a functionality component of the corresponding software code (e.g., software instructions responsible for performing a task, or a function comprising multiple components or sub-functions). In such a directed acyclic graph, a node with only outgoing edges is called a source node while a node with only incoming edges is called a sink node. Edges indicate the dependency between nodes (e.g., the output of the first node is an input to the second node) and the hierarchical relationship. The execution order of functions defines the edges of the graphical view 200 (e.g., for each pair of consecutive functions, the nodes are connected with a directed arc).

In at least some embodiments, a path in the graphical view 200 forms a cycle if the starting vertex of its first edge equals the ending vertex of its last edge, or when software code calls a first function and the output of the first function is applied to a second function. A cycle of functions in the graphical view 200 of FIG. 2 is treated as one function, represented as a single node. If a given node 210 represents multiple functions, for example, a sub-graph may be employed to illustrate the relationship among the multiple functions associated with the given node 210 (e.g., using the same approach to generate the sub-graph for the set of functions that is used to create the graphical view 200).

Causal graphs such as the graphical view 200 are graphical models used to encode causal relationships in some embodiments of a data generating process. Each variable in the model may have a corresponding node and an edge (e.g., an arc) that connects a first variable to a second variable if the second variable is presumed to respond to changes that occur in the first variable (e.g., when all other variables are held constant).

FIG. 3 illustrates exemplary pseudo code 300 for a software issue weight propagation process in accordance with an illustrative embodiment. In the example of FIG. 3, the pseudo code 300 is applied for each identified software issue and corresponding severity value. For each identified software issue, the pseudo code 300:

(i) identifies the corresponding node in the graphical view 200 (sometimes referred to herein as a source node) and increases the current weight assigned to the corresponding node by the severity value associated with the identified issue (e.g., as indicated in a support ticket);

(ii) traverses up at least one level in the graphical view 200 to one or more ancestor nodes (e.g., parent nodes) of the corresponding node; and (iii) for each ancestor node, increases the current weight assigned to each ancestor node using a decay function and the severity value of the identified issue.

For example, the pseudo code 300 may propagate a value equal to the severity value of the identified issue multiplied by a decay root cause coefficient (e.g., having a value less than 1), raised to the power of the hierarchical level number 220 of the ancestor node, as discussed further below in conjunction with FIG. 4. The decay root cause coefficient may be established and/or adjusted by a domain expert, or by applying a feedback loop approach. One exemplary weight propagation function for a source node and each ancestor node of the source node may be expressed as follows:

$$\text{Propagated Weight} = \text{Issue Severity Level} \times (\text{Decay Root Cause Coefficient})^{Node\ Level}.$$

In this manner, the pseudo code 300 assigns a weight to a source node and propagates a decayed weight, using the above weight propagation function, from the source node in the graphical view 200 to each ancestor node of the source node (e.g., parent nodes, grandparent nodes, etc.) until a root node 210-1 is reached. In general, the above weight propagation function assumes that an error link is greater for nodes that are closer in the software code to the source of the error. For example, an error associated with node 210-3 might be the result of something that happened with respect to the software code associated with node 210-2, with a higher probability than the result of something that happened with respect to the software code associated with node 210-1. When the weights are propagated through a graphical view 200 for multiple errors (e.g., in aggregate), the propagated weights indicate, on a relative basis, which nodes are associated with software code that is most important to refactor.

In some embodiments, weights may be assigned directly to nodes using the above weight propagation function without affirmatively propagating a weight from one node to another node, as would be apparent to a person of ordinary skill in the art based on the present discussion.

Figure 4:
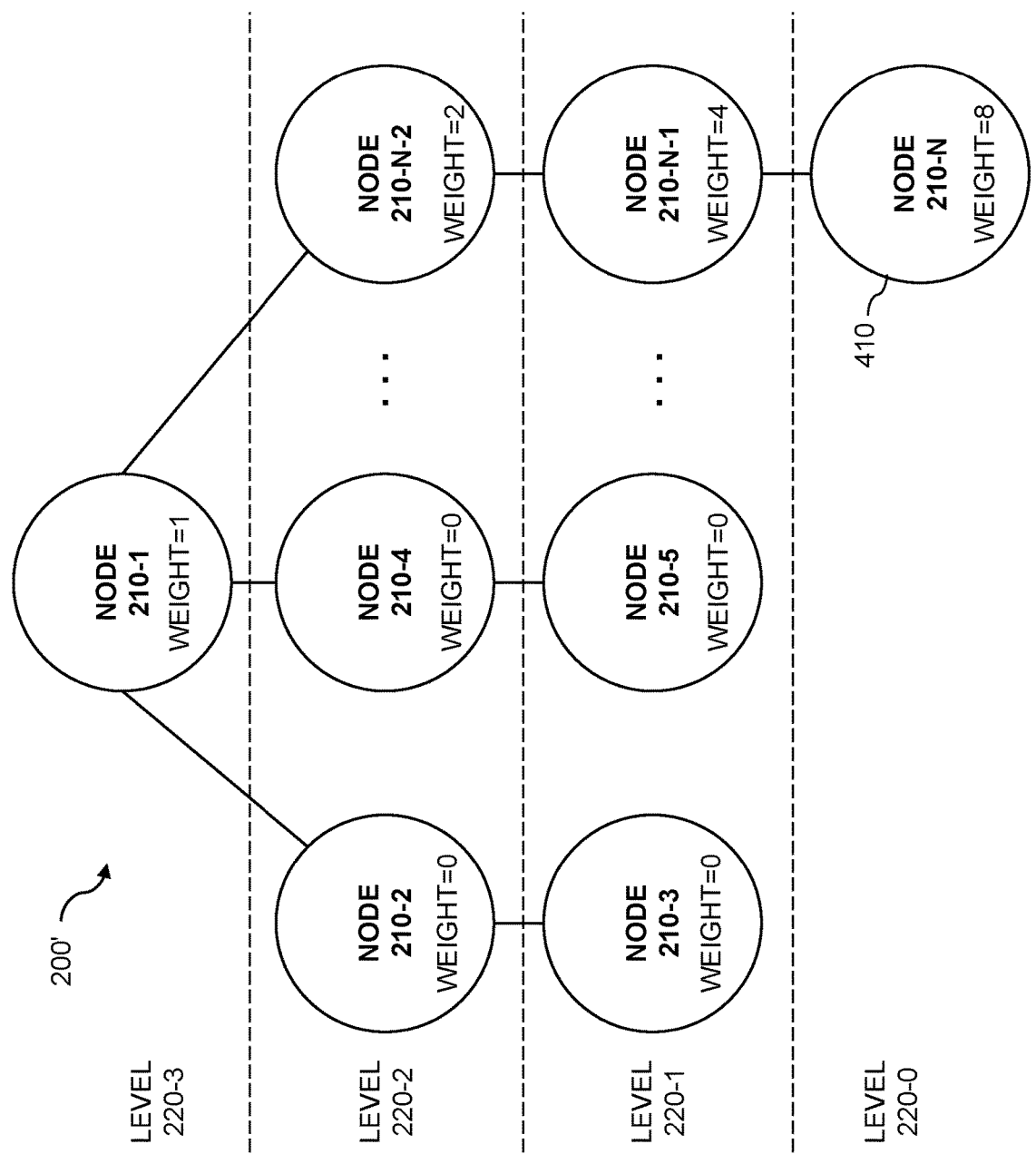
FIG. 4 illustrates the graphical view of FIG. 2 which has been updated to reflect a weight propagation by the process of FIG. 3 in accordance with an illustrative embodiment.

FIG. 4 illustrates a modified graphical view 200' of the graphical view 200 of FIG. 2 (e.g., updated to reflect a weight propagation by the process of FIG. 3) in accordance with an illustrative embodiment. In the example of FIG. 4, a particular software issue associated with a source node 410

(corresponding to node 210-N in the graphical view 200') is being processed. The particular software issue being processed in FIG. 4 has an exemplary severity level of eight (e.g., as assigned by the support ticket processing server 130 and indicated in a support ticket associated with the particular software issue) and an exemplary decay root cause coefficient of 0.5 has been established. It is noted that a source node 410 is identified by mapping an error associated with a particular support ticket into a given node 210 of the graphical view 200' (e.g., by identifying a line of code where the error was raised and where the line of code is found in the graphical view 200').

As noted above, for a given software issue and a corresponding severity value, the pseudo code 300 identifies the source node 410 associated with the given software issue and uses the corresponding severity value to propagate a corresponding weight from the source node 410 in the graphical view 200 to each ancestor node of the source node 410 (e.g., parent nodes, grandparent nodes, etc.) until a root node 210-1 is reached. Thus, a weight is assigned to the source node 410 by converting the severity level of the given software issue to a severity value (for example, a textual or color-coded severity level classification can be converted to a corresponding numerical severity value). In the example of FIG. 4, the source node 410 is assigned a weight of 8.

Thereafter, the weight is propagated to each ancestor node of the source node 410 using the above weight propagation function. For example, the weight assigned to the source node 410 is propagated to each given ancestor node of the source node 410 by multiplying the weight of the source node 410 by the decay root cause coefficient, raised to the power of the hierarchical level number 220 of the given ancestor node.

In some embodiments, following the propagation of a set of errors to be processed through the graphical view 200' using the pseudo code 300, the nodes 210 that have been identified (e.g., by a subject matter or domain expert) as a code refactoring candidate are prioritized (e.g., in a descending order) based on the aggregate weight of each code refactoring candidate node. For example, a domain expert may know which portions of software code are old and/or outdated and in need of refactoring and may designate nodes corresponding to such designated code portions as code refactoring candidates. In addition, a weight threshold may optionally be defined to narrow the list and increase the probability of refactoring a code function that can cause issues.

Figure 5:
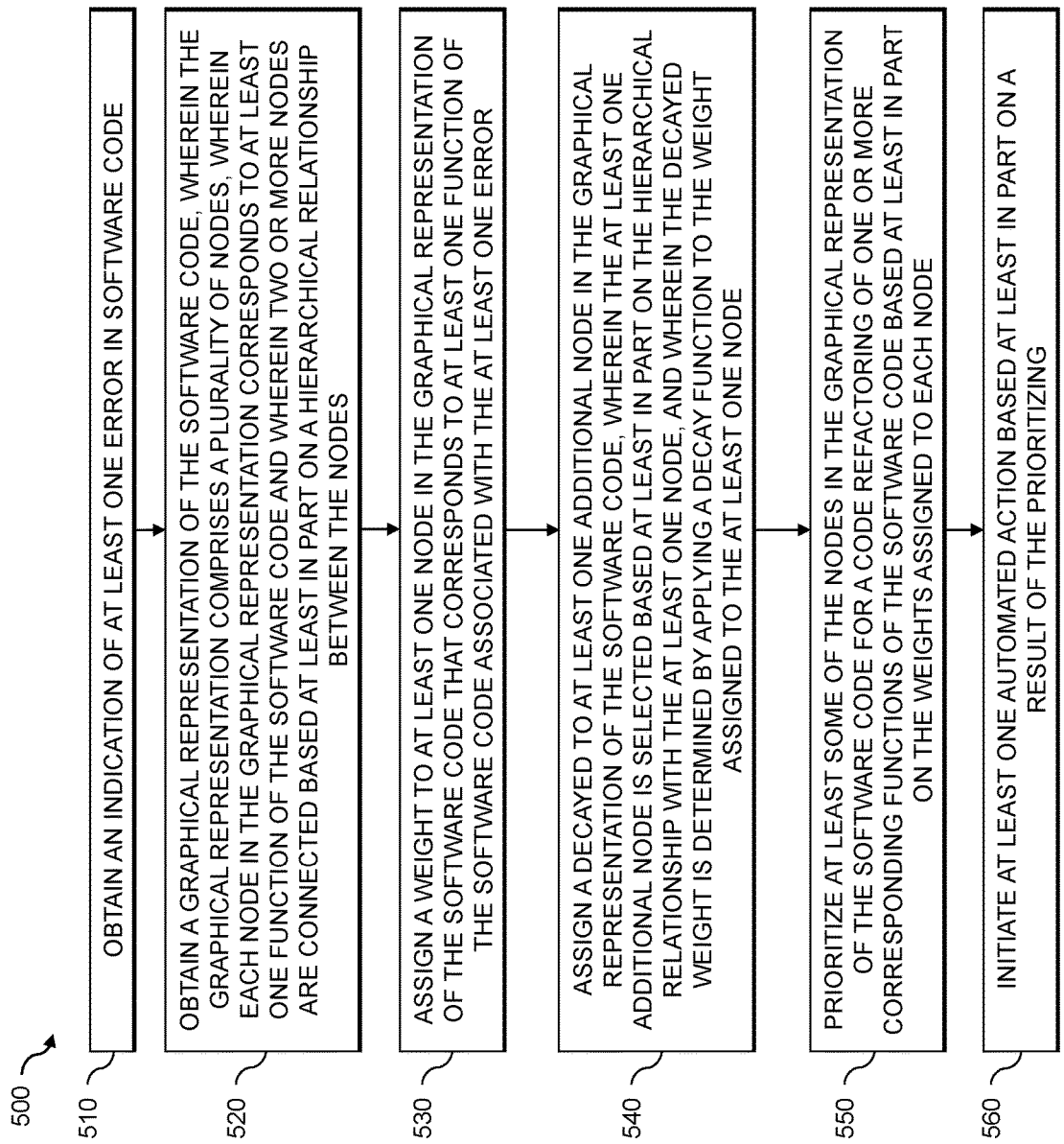
FIG. 5 is a flow diagram illustrating an exemplary process for software code refactoring prioritization using software code defect aggregation in a graphical code representation in accordance with an illustrative embodiment.

FIG. 5 is a flow diagram illustrating an exemplary process 500 for software code refactoring prioritization using software code defect aggregation in a graphical code representation in accordance with an illustrative embodiment. In the example of FIG. 5, an indication is obtained in step 510 of at least one error in software code. In step 520, a graphical representation of the software code is obtained, wherein the graphical representation comprises a plurality of nodes, wherein each node in the graphical representation corresponds to at least one function of the software code and wherein two or more nodes in the graphical representation are connected based at least in part on a hierarchical relationship between the nodes.

In step 530, the process 500 assigns a weight to at least one node in the graphical representation of the software code that corresponds to at least one function of the software code associated with the at least one error. In step 540, a decayed weight is assigned to at least one additional node in the graphical representation of the software code, wherein the at least one additional node is selected based at least in part on the hierarchical relationship with the at least one node, and wherein the decayed weight is determined by applying a decay function to the weight assigned to the at least one node.

At least some of the nodes in the graphical representation of the software code are prioritized in step 550 for a code refactoring of one or more corresponding functions of the software code based at least in part on the weights assigned to each node. Finally, at least one automated action is initiated in step 560 based at least in part on a result of the prioritizing.

In one or more embodiments, the indication of the at least one error further comprises an indication of a severity level of the indicated at least one error and wherein the weight assigned to the at least one node in the graphical representation is based at least in part on the severity level of the indicated at least one error.

In some embodiments, the graphical representation of the software code comprises a directed acyclic graph and a cycle in the software code is represented by a single node. The graphical representation of the software code may be generated by executing the software code and obtaining an ordered listing of the functions executed by the software code. The assigning the weight to at least one node in the graphical representation of the software code may comprise identifying the at least one node that corresponds to the at least one function of the software code that is a cause of the at least one error. The propagating the weight from the at least one node to the at least one additional node may comprise recursively propagating the weight from the at least one node to one or more ancestor nodes of the at least one node. The recursively propagating the weight from the at least one node to the one or more ancestor nodes of the at least one node may apply the decay function to the weight such that the weight decreases for each traversal from the at least one node to each of the one or more ancestor nodes.

In at least one embodiment, the at least one automated action comprises at least one of: generating at least one notification corresponding to at least one of the prioritized nodes in the graphical representation of the software code; generating update information related to an update of the software code to address the at least one error; generating a description of a plurality of errors in the software code by aggregating descriptions of the plurality of errors as each error is applied to the graphical representation of the software code; traversing the graphical representation of the software code using a graphical user interface to provide an indication of at least one of the prioritized nodes in the graphical representation; and generating an update of the software code to address the at least one error.

In some embodiments, the automated action may comprise generating issue summarization information that may facilitate an update of one or more issues in software code by a user. Among other benefits, the disclosed graphical-based software code refactoring prioritization techniques provide a mechanism for traversing the graphical view 200 of FIG. 2 to propagate weight. In addition, the traversal provides an opportunity for aggregating issue information associated with each node in the graphical view 200. For example, free text information associated with all of the connected issues may be leveraged to provide additional information and potentially indicators to support a decision by a domain expert regarding whether a refactoring is needed and to determine the urgency. The description field of all can be consolidated and/or aggregated into a single coherent description of issues associated with the various nodes in the graphical view 200, thereby capturing the main topics mentioned in the connected issues. Word2Vec techniques may be employed in some embodiments to map words from the ticket description based on their meaning, and a Spacy Python script may be employed to calculate a distance between words, where the word2vec model is trained on the English language.

The semantic meaning may be used for summarizing the issues into a story. In general, the causality and connections between the nodes in the graphical view 200' are derived from the graph traversal and the language that describes the issues. A backward traversal from a given node may be used to compose a story regarding the root cause of one or more issues and how the root cause propagates to different functionality components (e.g., nodes). For example, for a given issue, a high-level story may be provided, as well as an indication of the components affected by the given issue. A user may double click on a node, for example, to obtain more details regarding the underlying issues that were aggregated.

The particular processing operations and other network functionality described in conjunction with the pseudo code of FIG. 3 and the flow diagram of FIG. 5 are presented by way of illustrative example only, and should not be construed as limiting the scope of the disclosure in any way. Alternative embodiments can use other types of processing operations for software code refactoring prioritization using software code defect aggregation in a graphical code representation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for software code refactoring prioritization using software code defect aggregation in a graphical code representation provide a mechanism for leveraging the data created on software code issues, such as the information in a support ticket related to a given issue. A casualty graph representation of the software code components is employed in some embodiments to identify refactoring candidates, in combination, and thereby reveal underlying relations between independent issues (and to identify a potential root cause of the refactoring candidates). The software code issues may be aggregated by traversing the graphical view 200 to investigate issue data in the graphical view 200. Alerts or other notifications may be generated indicating a relative severity value by combining the number of related issues and their original severity. In this manner, nodes can be compared on a relative basis based on the accumulated weights, and then used to prioritize the corresponding code refactoring candidates.

One or more embodiments of the disclosure provide improved methods, apparatus and computer program products for software code refactoring prioritization using software code defect aggregation in a graphical code representation. The foregoing applications and associated embodiments should be considered as illustrative only, and numerous other embodiments can be configured using the techniques disclosed herein, in a wide variety of different applications.

It should also be understood that the disclosed techniques for graphical-based software code refactoring prioritization, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for software code refactoring prioritization using software code defect aggregation in a graphical code representation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform as a service (PaaS) model, an Infrastructure as a service (IaaS) model, a Storage-as-a-Service (STaaS) model and/or a Function-as-a-Service (FaaS) model, although numerous alternative arrangements are possible. Also, illustrative embodiments can be implemented outside of the cloud infrastructure context, as in the case of a stand-alone computing and storage system implemented within a given enterprise.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software code refactoring prioritization engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based software code refactoring prioritization platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
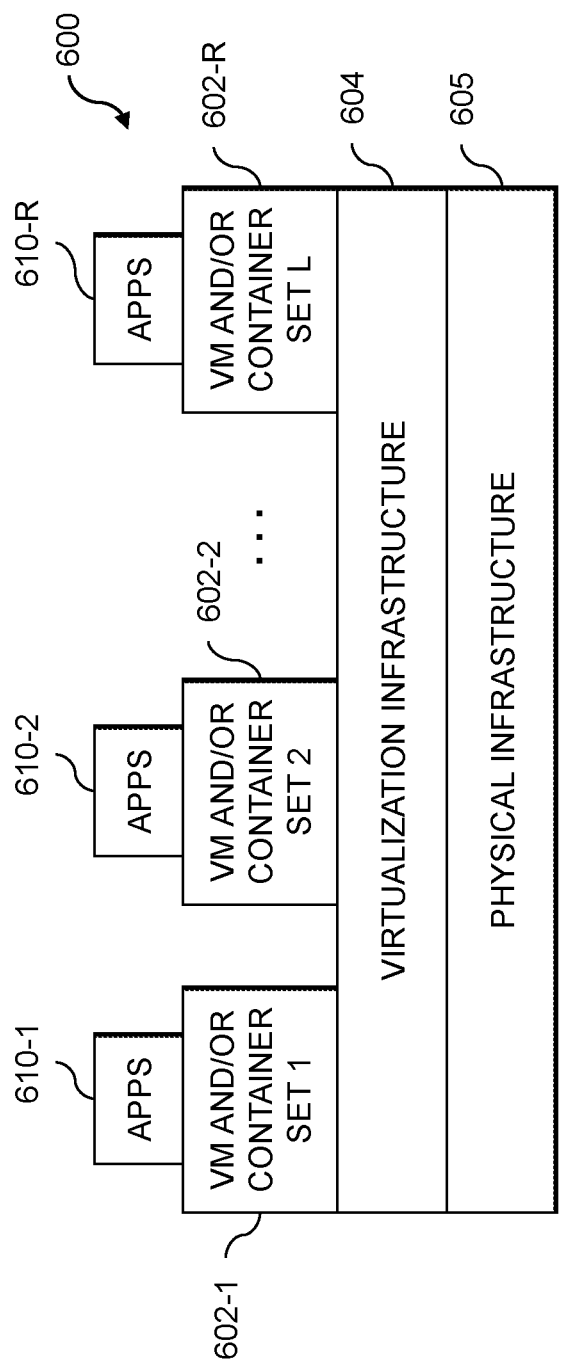
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-R implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-R running on respective ones of the VMs/container sets 602-1, 602-2, . . . 602-R under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide graphical-based software code refactoring prioritization functionality of the type described above for one or more processes running on a given one of the VMs. For example, each of the VMs can implement graphical-based software code refactoring prioritization control logic and associated functionality for refactoring software code for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide graphical-based software code refactoring prioritization functionality of the type described above for one or more processes running on different ones of the containers. For example, a container host device supporting multiple containers of one or more container sets can implement one or more instances of graphical-based software code refactoring prioritization control logic and associated functionality for refactoring software code.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
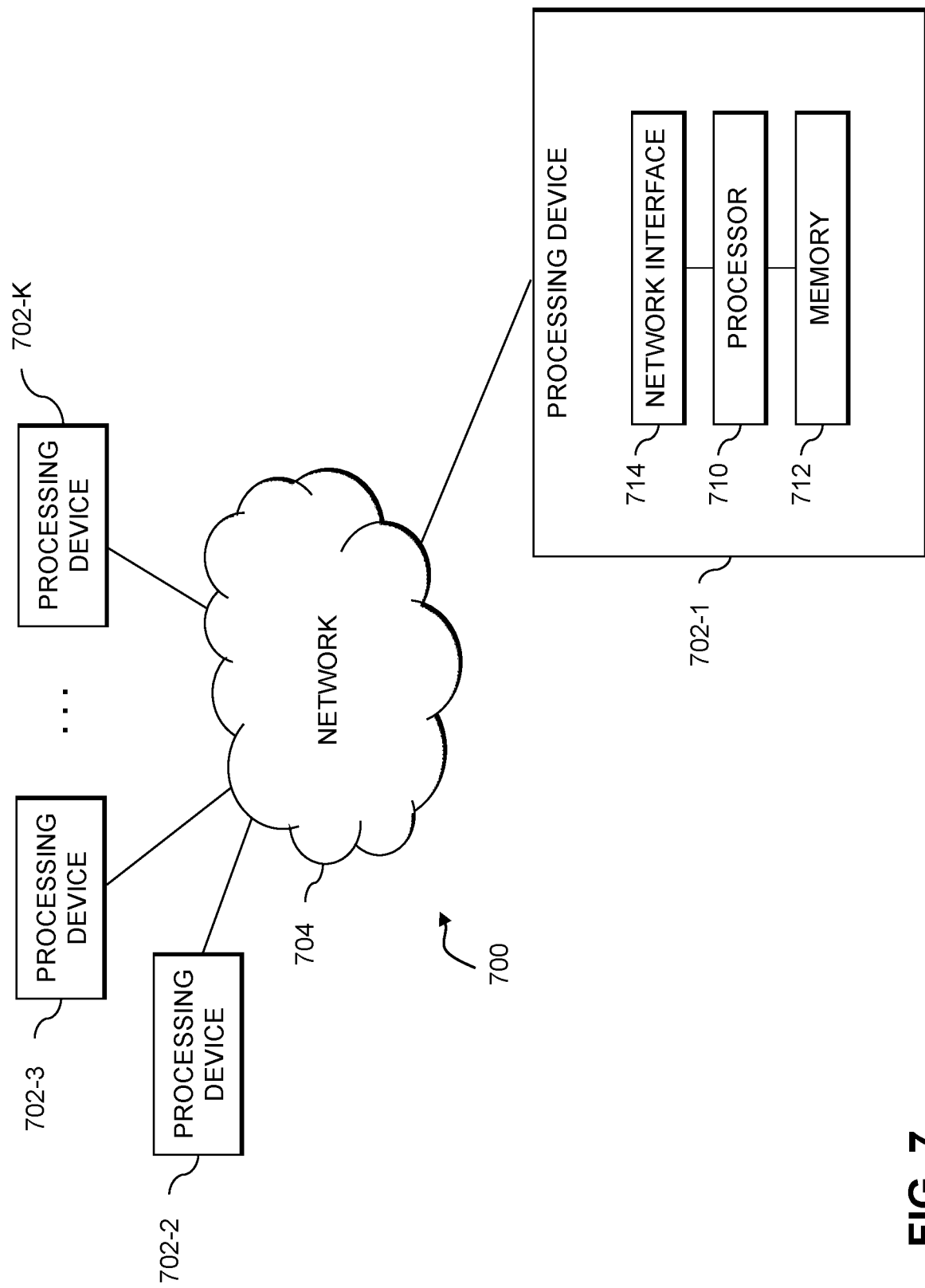
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining an indication of at least one error in software code;
    obtaining a processor-readable graphical representation of the software code, wherein the processor-readable graphical representation comprises a plurality of nodes, wherein each node in the processor-readable graphical representation corresponds to at least one function of the software code and wherein two or more nodes in the processor-readable graphical representation are connected based at least in part on a hierarchical relationship between the nodes,
    wherein at least one node in the processor-readable graphical representation of the software code comprises a weight that corresponds to at least one function of the software code associated with the at least one error,
    wherein at least one additional node comprises a decayed weight, wherein the at least one additional node has a hierarchical relationship with the at least one node, and wherein the decayed weight for the at least one additional node is automatically determined by at least one processing device that (i) obtains the weight assigned to the at least one node, (ii) applies a decay function to the obtained weight based at least in part on the hierarchical relationship between the at least one node and one or more of the at least one additional node, and (iii) recursively propagates the decayed weight to one or more ancestor nodes of the at least one node; and
    automatically initiating a code refactoring of one or more corresponding functions of the software code based at least in part on a prioritization of the plurality of nodes using the weights assigned to each node;
    wherein the method is performed by at least one processing device comprising a hardware-based processor coupled to a memory.

2. The method of claim 1, wherein the indication of the at least one error further comprises an indication of a severity level of the indicated at least one error and wherein the weight assigned to the at least one node in the graphical representation is based at least in part on the severity level of the indicated at least one error.

3. The method of claim 1, wherein the graphical representation of the software code comprises a directed acyclic graph, and wherein a cycle in the software code is represented by a single node in the graphical representation.

4. The method of claim 1, wherein the graphical representation of the software code is generated by executing the software code and obtaining an ordered listing of the functions executed by the software code to determine the connections between each node.

5. The method of claim 1, further comprising assigning the weight to the at least one node in the graphical representation of the software code by identifying the at least one node that corresponds to the at least one function of the software code that is a cause of the at least one error.

6. The method of claim 1, wherein the recursively propagating the decayed weight to the one or more ancestor nodes of the at least one node applies the decay function to the decayed weight such that the weight decreases for each traversal from the at least one node to each of the one or more ancestor nodes.

7. The method of claim 1, further comprising initiating at least one automated action comprising at least one of:
    generating at least one notification corresponding to at least one of the prioritized plurality of nodes in the graphical representation of the software code;
    generating update information related to an update of the software code to address the at least one error;
    generating a description of a plurality of errors in the software code by aggregating descriptions of the plurality of errors as each error is applied to the graphical representation of the software code;
    traversing the graphical representation of the software code using a graphical user interface to provide an indication of at least one of the prioritized plurality of nodes in the graphical representation; and
    generating an update of the software code to address the at least one error.

8. The method of claim 1, wherein the decayed weight for a given additional node of the at least one node is automatically determined by multiplying a severity level of the indicated at least one error by a decay root cause coefficient, raised to a power of a hierarchical level number of the given additional node of the at least one node.

9. An apparatus comprising:
    at least one processing device comprising a hardware-based processor coupled to a memory;
    the at least one processing device being configured to implement the following steps:
    obtaining an indication of at least one error in software code;
    obtaining a processor-readable graphical representation of the software code, wherein the processor-readable graphical representation comprises a plurality of nodes, wherein each node in the processor-readable graphical representation corresponds to at least one function of the software code and wherein two or more nodes in the processor-readable graphical representation are connected based at least in part on a hierarchical relationship between the nodes, wherein at least one node in the processor-readable graphical representation of the software code comprises a weight that corresponds to at least one function of the software code associated with the at least one error, wherein at least one additional node comprises a decayed weight, wherein the at least one additional node has a hierarchical relationship with the at least one node, and wherein the decayed weight for the at least one additional node is automatically determined by at least one processing device that (i) obtains the weight assigned to the at least one node, (ii) applies a decay function to the obtained weight based at least in part on the hierarchical relationship between the at least one node and one or more of the at least one additional node, and (iii) recursively propagates the decayed weight to one or more ancestor nodes of the at least one node; and automatically initiating a code refactoring of one or more corresponding functions of the software code based at least in part on a prioritization of the plurality of nodes using the weights assigned to each node.

10. The apparatus of claim 9, wherein the indication of the at least one error further comprises an indication of a severity level of the indicated at least one error and wherein the weight assigned to the at least one node in the graphical representation is based at least in part on the severity level of the indicated at least one error.

11. The apparatus of claim 9, wherein the graphical representation of the software code is generated by executing the software code and obtaining an ordered listing of the functions executed by the software code to determine the connections between each node.

12. The apparatus of claim 9, further comprising assigning the weight to the at least one node in the graphical representation of the software code by identifying the at least one node that corresponds to the at least one function of the software code that is a cause of the at least one error.

13. The apparatus of claim 9, wherein the recursively propagating the decayed weight to the one or more ancestor nodes of the at least one node applies the decay function to the decayed weight such that the weight decreases for each traversal from the at least one node to each of the one or more ancestor nodes.

14. The apparatus of claim 9, further comprising initiating at least one automated action comprising at least one of:
generating at least one notification corresponding to at least one of the prioritized plurality of nodes in the graphical representation of the software code;
generating update information related to an update of the software code to address the at least one error;
generating a description of a plurality of errors in the software code by aggregating descriptions of the plurality of errors as each error is applied to the graphical representation of the software code;
traversing the graphical representation of the software code using a graphical user interface to provide an indication of at least one of the prioritized nodes in the graphical representation; and
generating an update of the software code to address the at least one error.

15. A non-transitory processor-readable storage medium having stored therein program code of one or more software programs, wherein the program code when executed by at least one processing device causes the at least one processing device to perform the following steps:
obtaining an indication of at least one error in software code;
obtaining a processor-readable graphical representation of the software code, wherein the processor-readable graphical representation comprises a plurality of nodes, wherein each node in the processor-readable graphical representation corresponds to at least one function of the software code and wherein two or more nodes in the processor-readable graphical representation are connected based at least in part on a hierarchical relationship between the nodes,
wherein at least one node in the processor-readable graphical representation of the software code comprises a weight that corresponds to at least one function of the software code associated with the at least one error,
wherein at least one additional node comprises a decayed weight, wherein the at least one additional node has a hierarchical relationship with the at least one node, and wherein the decayed weight for the at least one additional node is automatically determined by at least one processing device that (i) obtains the weight assigned to the at least one node, (ii) applies a decay function to the obtained weight based at least in part on the hierarchical relationship between the at least one node and one or more of the at least one additional node, and (iii) recursively propagates the decayed weight to one or more ancestor nodes of the at least one node; and
automatically initiating a code refactoring of one or more corresponding functions of the software code based at least in part on a prioritization of the plurality of nodes using the weights assigned to each node.

16. The non-transitory processor-readable storage medium of claim 15, wherein the indication of the at least one error further comprises an indication of a severity level of the indicated at least one error and wherein the weight assigned to the at least one node in the graphical representation is based at least in part on the severity level of the indicated at least one error.

17. The non-transitory processor-readable storage medium of claim 15, wherein the graphical representation of the software code is generated by executing the software code and obtaining an ordered listing of the functions executed by the software code to determine the connections between each node.

18. The non-transitory processor-readable storage medium of claim 15, further comprising assigning the weight to the at least one node in the graphical representation of the software code by identifying the at least one node that corresponds to the at least one function of the software code that is a cause of the at least one error.

19. The non-transitory processor-readable storage medium of claim 15, wherein the recursively propagating the decayed weight to the one or more ancestor nodes of the at least one node applies the decay function to the decayed weight such that the weight decreases for each traversal from the at least one node to each of the one or more ancestor nodes.

20. The non-transitory processor-readable storage medium of claim 15, further comprising at least one automated action comprising at least one of:

generating at least one notification corresponding to at least one of the prioritized plurality of nodes in the graphical representation of the software code;

generating update information related to an update of the software code to address the at least one error;

generating a description of a plurality of errors in the software code by aggregating descriptions of the plurality of errors as each error is applied to the graphical representation of the software code;

traversing the graphical representation of the software code using a graphical user interface to provide an indication of at least one of the prioritized plurality of nodes in the graphical representation; and generating an update of the software code to address the at least one error.

* * * * *